United States Patent
Rose et al.

(10) Patent No.: US 7,826,613 B2
(45) Date of Patent: Nov. 2, 2010

(54) STREAM CIPHER CRYPTOGRAPHIC SYSTEM AND METHOD

(75) Inventors: Gregory Gordon Rose, Concord (AU); Philip Michael Hawkes, Burwood (AU)

(73) Assignee: QUALCOMM Incorporated, San Diego, CA (US)

( * ) Notice: Subject to any disclaimer, the term of this patent is extended or adjusted under 35 U.S.C. 154(b) by 1071 days.

(21) Appl. No.: 10/644,689

(22) Filed: Aug. 19, 2003

(65) Prior Publication Data

US 2004/0071289 A1   Apr. 15, 2004

Related U.S. Application Data

(60) Provisional application No. 60/404,638, filed on Aug. 19, 2002.

(51) Int. Cl.
*H04K 1/04* (2006.01)
(52) U.S. Cl. ...................................................... 380/37
(58) Field of Classification Search .................. 380/37, 380/38, 42–47, 283, 255, 259, 277, 278
See application file for complete search history.

(56) References Cited

U.S. PATENT DOCUMENTS

| | | | | |
|---|---|---|---|---|
| 6,009,135 A | * | 12/1999 | Ozluturk | 375/377 |
| 6,141,374 A | * | 10/2000 | Burns | 375/152 |
| 6,339,646 B1 | * | 1/2002 | Dahlman et al. | 380/273 |
| 6,496,474 B1 | * | 12/2002 | Nagatani et al. | 370/208 |
| 6,560,212 B1 | * | 5/2003 | Prasad et al. | 370/335 |
| 6,707,914 B1 | * | 3/2004 | Bell | 380/46 |
| 2005/0084112 A1 | * | 4/2005 | Kim et al. | 380/268 |

OTHER PUBLICATIONS

Ekdahl et al. 'SNOW—a new stream cipher' Nov. 2001.*
Copersmith et al. 'Cryptanalysis of ciphers with linear masking' Feb. 2002.*

* cited by examiner

*Primary Examiner*—Beemnet W Dada
(74) *Attorney, Agent, or Firm*—Won Tae C Kim

(57) ABSTRACT

Apparatus and method for generating a key stream is disclosed. In one embodiment, a cryptographic function is applied on input values selected from a first array of values to generate output values. Mask values are then selected from a second array of values and combined with the output values to generate a key stream block for the key stream. The first and second arrays are finite and may be implemented by a linear feedback shift register.

48 Claims, 10 Drawing Sheets

```
{ 0x61, 0x51, 0xeb, 0x19, 0xb9, 0x5d, 0x60, 0x38,
  0x7c, 0xb2, 0x06, 0x12, 0xc4, 0x5b, 0x16, 0x3b,
  0x2b, 0x18, 0x83, 0xb0, 0x7f, 0x75, 0xfa, 0xa0,
  0xe9, 0xdd, 0x6d, 0x7a, 0x6b, 0x68, 0x2d, 0x49,
  0xb5, 0x1c, 0x90, 0xf7, 0xed, 0x9f, 0xe8, 0xce,
  0xae, 0x77, 0xc2, 0x13, 0xfd, 0xcd, 0x3e, 0xcf,
  0x37, 0x6a, 0xd4, 0xdb, 0x8e, 0x65, 0x1f, 0x1a,
  0x87, 0xcb, 0x40, 0x15, 0x88, 0x0d, 0x35, 0xb3,
  0x11, 0x0f, 0xd0, 0x30, 0x48, 0xf9, 0xa8, 0xac,
  0x85, 0x27, 0x0e, 0x8a, 0xe0, 0x50, 0x64, 0xa7,
  0xcc, 0xe4, 0xf1, 0x98, 0xff, 0xa1, 0x04, 0xda,
  0xd5, 0xbc, 0x1b, 0xbb, 0xd1, 0xfe, 0x31, 0xca,
  0xba, 0xd9, 0x2e, 0xf3, 0x1d, 0x47, 0x4a, 0x3d,
  0x71, 0x4c, 0xab, 0x7d, 0x8d, 0xc7, 0x59, 0xb8,
  0xc1, 0x96, 0x1e, 0xfc, 0x44, 0xc8, 0x7b, 0xdc,
  0x5c, 0x78, 0x2a, 0x9d, 0xa5, 0xf0, 0x73, 0x22,
  0x89, 0x05, 0xf4, 0x07, 0x21, 0x52, 0xa6, 0x28,
  0x9a, 0x92, 0x69, 0x8f, 0xc5, 0xc3, 0xf5, 0xe1,
  0xde, 0xec, 0x09, 0xf2, 0xd3, 0xaf, 0x34, 0x23,
  0xaa, 0xdf, 0x7e, 0x82, 0x29, 0xc0, 0x24, 0x14,
  0x03, 0x32, 0x4e, 0x39, 0x6f, 0xc6, 0xb1, 0x9b,
  0xea, 0x72, 0x79, 0x41, 0xd8, 0x26, 0x6c, 0x5e,
  0x2c, 0xb4, 0xa2, 0x53, 0x57, 0xe2, 0x9c, 0x86,
  0x54, 0x95, 0xb6, 0x80, 0x8c, 0x36, 0x67, 0xbd,
  0x08, 0x93, 0x2f, 0x99, 0x5a, 0xf8, 0x3a, 0xd7,
  0x56, 0x84, 0xd2, 0x01, 0xf6, 0x66, 0x4d, 0x55,
  0x8b, 0x0c, 0x0b, 0x46, 0xb7, 0x3c, 0x45, 0x91,
  0xa4, 0xe3, 0x70, 0xd6, 0xfb, 0xe6, 0x10, 0xa9,
  0xc9, 0x00, 0x9e, 0xe7, 0x4f, 0x76, 0x25, 0x3f,
  0x5f, 0xa3, 0x33, 0x20, 0x02, 0xef, 0x62, 0x74,
  0xee, 0x17, 0x81, 0x42, 0x58, 0x0a, 0x4b, 0x63,
  0xe5, 0xbe, 0x6e, 0xad, 0xbf, 0x43, 0x94, 0x97 }
```

```
{ 0x00000000, 0x72C688E8, 0xE4C15D9D, 0x9607D575,
  0x85CFBA77, 0xF709329F, 0x610EE7EA, 0x13C86F02,
  0x47D339EE, 0x3515B106, 0xA3126473, 0xD1D4EC9B,
  0xC21C8399, 0xB0DA0B71, 0x26DDDE04, 0x541B56EC,
  0x8EEB7291, 0xFC2DFA79, 0x6A2A2F0C, 0x18ECA7E4,
  0x0B24C8E6, 0x79E2400E, 0xEFE5957B, 0x9D231D93,
  0xC9384B7F, 0xBBFEC397, 0x2DF916E2, 0x5F3F9E0A,
  0x4CF7F108, 0x3E3179E0, 0xA836AC95, 0xDAF0247D,
  0x519BE46F, 0x235D6C87, 0xB55AB9F2, 0xC79C311A,
  0xD4545E18, 0xA692D6F0, 0x30950385, 0x42538B6D,
  0x1648DD81, 0x648E5569, 0xF289801C, 0x804F08F4,
  0x938767F6, 0xE141EF1E, 0x77463A6B, 0x0580B283,
  0xDF7096FE, 0xADB61E16, 0x3BB1CB63, 0x4977438B,
  0x5ABF2C89, 0x2879A461, 0xBE7E7114, 0xCCB8F9FC,
  0x98A3AF10, 0xEA6527F8, 0x7C62F28D, 0x0EA47A65,
  0x1D6C1567, 0x6FAA9D8F, 0xF9AD48FA, 0x8B6BC012,
  0xA27B85DE, 0xD0BD0D36, 0x46BAD843, 0x347C50AB,
  0x27B43FA9, 0x5572B741, 0xC3756234, 0xB1B3EADC,
  0xE5A8BC30, 0x976E34D8, 0x0169E1AD, 0x73AF6945,
  0x60670647, 0x12A18EAF, 0x84A65BDA, 0xF660D332,
  0x2C90F74F, 0x5E567FA7, 0xC851AAD2, 0xBA97223A,
  0xA95F4D38, 0xDB99C5D0, 0x4D9E10A5, 0x3F58984D,
  0x6B43CEA1, 0x19854649, 0x8F82933C, 0xFD441BD4,
  0xEE8C74D6, 0x9C4AFC3E, 0x0A4D294B, 0x788BA1A3,
  0xF3E061B1, 0x8126E959, 0x17213C2C, 0x65E7B4C4,
  0x762FDBC6, 0x04E9532E, 0x92EE865B, 0xE0280EB3,
  0xB433585F, 0xC6F5D0B7, 0x50F205C2, 0x22348D2A,
  0x31FCE228, 0x433A6AC0, 0xD53DBFB5, 0xA7FB375D,
  0x7D0B1320, 0x0FCD9BC8, 0x99CA4EBD, 0xEB0CC655,
  0xF8C4A957, 0x8A0221BF, 0x1C05F4CA, 0x6EC37C22,
  0x3AD82ACE, 0x481EA226, 0xDE197753, 0xACDFFFBB,
  0xBF1790B9, 0xCDD11851, 0x5BD6CD24, 0x291045CC,
  0x09F647F1, 0x7B30CF19, 0xED371A6C, 0x9FF19284,
  0x8C39FD86, 0xFEFF756E, 0x68F8A01B, 0x1A3E28F3,
  0x4E257E1F, 0x3CE3F6F7, 0xAAE42382, 0xD822AB6A,
  0xCBEAC468, 0xB92C4C80, 0x2F2B99F5, 0x5DED111D,
  0x871D3560, 0xF5DBBD88, 0x63DC68FD, 0x111AE015,
  0x02D28F17, 0x701407FF, 0xE613D28A, 0x94D55A62,
  0xC0CE0C8E, 0xB2088466, 0x240F5113, 0x56C9D9FB,
  0x4501B6F9, 0x37C73E11, 0xA1C0EB64, 0xD306638C,
  0x586DA39E, 0x2AAB2B76, 0xBCACFE03, 0xCE6A76EB,
  0xDDA219E9, 0xAF649101, 0x39634474, 0x4BA5CC9C,
  0x1FBE9A70, 0x6D781298, 0xFB7FC7ED, 0x89B94F05,
  0x9A712007, 0xE8B7A8EF, 0x7EB07D9A, 0x0C76F572,
  0xD686D10F, 0xA44059E7, 0x32478C92, 0x4081047A,
```

(CONTINUED IN FIGURE 7B)

( CONTINUED FROM FIGURE 7A )

```
0x53496B78,  0x218FE390,  0xB78836E5,  0xC54EBE0D,
0x9155E8E1,  0xE3936009,  0x7594B57C,  0x07523D94,
0x149A5296,  0x665CDA7E,  0xF05B0F0B,  0x829D87E3,
0xAB8DC22F,  0xD94B4AC7,  0x4F4C9FB2,  0x3D8A175A,
0x2E427858,  0x5C84F0B0,  0xCA8325C5,  0xB845AD2D,
0xEC5EFBC1,  0x9E987329,  0x089FA65C,  0x7A592EB4,
0x699141B6,  0x1B57C95E,  0x8D501C2B,  0xFF9694C3,
0x2566B0BE,  0x57A03856,  0xC1A7ED23,  0xB36165CB,
0xA0A90AC9,  0xD26F8221,  0x44685754,  0x36AEDFBC,
0x62B58950,  0x107301B8,  0x8674D4CD,  0xF4B25C25,
0xE77A3327,  0x95BCBBCF,  0x03BB6EBA,  0x717DE652,
0xFA162640,  0x88D0AEA8,  0x1ED77BDD,  0x6C11F335,
0x7FD99C37,  0x0D1F14DF,  0x9B18C1AA,  0xE9DE4942,
0xBDC51FAE,  0xCF039746,  0x59044233,  0x2BC2CADB,
0x380AA5D9,  0x4ACC2D31,  0xDCCBF844,  0xAE0D70AC,
0x74FD54D1,  0x063BDC39,  0x903C094C,  0xE2FA81A4,
0xF132EEA6,  0x83F4664E,  0x15F3B33B,  0x67353BD3,
0x332E6D3F,  0x41E8E5D7,  0xD7EF30A2,  0xA529B84A,
0xB6E1D748,  0xC4275FA0,  0x52208AD5,  0x20E6023D }
```

STREAM CIPHER CRYPTOGRAPHIC SYSTEM AND METHOD

CROSS-REFERENCE TO RELATED APPLICATIONS

This application claims priority to Provisional Application No. 60/404,638 entitled "Stream Cipher Cryptographic System and Method" filed Aug. 19, 2002, and assigned to the assignee hereof and hereby expressly incorporated by reference herein.

This application is related to the co-pending U.S. application Ser. No. 09/846,443 filed on Apr. 30, 2001 which is a continuation of U.S. Pat. No. 6,252,958 filed on which is Oct. 24, 1997 which is a continuation-in-part of U.S. Pat. No. 6,510,228 filed on Sep. 22, 1997, all entitled "Method and Apparatus For Generating Encryption Stream Ciphers" and assigned to the same assignee of the present application.

This application is also related to co-pending U.S. application Ser. No. 10/145,365 filed on May 13, 2002 which is a continuation of U.S. Pat. No. 6,490,357 filed on Aug. 28, 1998, both entitled "Method and Apparatus For Generating Encryption Stream Ciphers" and assigned to the same assignee of the present application.

BACKGROUND

I. Field of Invention

The present invention relates to encryption and more particularly to a method and apparatus for generating encryption stream ciphers.

II. Description of the Related Art

Encryption is a process whereby data is manipulated by a random process such that the data is made unintelligible by all but the targeted recipient. One method of encryption for digitized data is through the use of stream ciphers. Stream ciphers work by taking the data to be encrypted and a stream of pseudo-random bits (or encryption bit stream) generated by an encryption algorithm and combining them, usually with the exclusive-or (XOR) operation. Decryption is simply the process of generating the same encryption bit stream and removing the encryption bit stream with the corresponding operation from the encrypted data. If the XOR operation was performed at the encryption side, the same XOR operation is also performed at the decryption side. For a secured encryption, the encryption bit stream must be computationally difficult to predict.

Many of the techniques used for generating the stream of pseudo-random numbers are based on linear feedback shift register (LFSR) over the Galois finite field of order 2. This is a special case of the Galois Finite field of order $2^n$ where n is a positive integer. For n=1, the elements of the Galois field comprise bit values zero and one. The register is updated by shifting the bits over by one bit position and calculating a new output bit. The new bit is shifted into the register. For a Fibonacci register, the output bit is a linear function of the bits in the register. For a Galois register, many bits are updated in accordance with the output bit just shifted out from the register. Mathematically, the Fibonacci and Galois register architectures are equivalent.

The operations involved in generating the stream of pseudo-random numbers, namely the shifting and bit extraction, are efficient in hardware but inefficient in software or other implementations employing a general purpose processor or microprocessor. The inefficiency increases as the length of the shift register exceeds the length of the registers in the processor used to generate the stream. In addition, for n=0, only one output bit is generated for each set of operations which, again, results in a very inefficient use of the processor.

An exemplary application which utilizes stream ciphers is wireless telephony. An exemplary wireless telephony communication system is a code division multiple access (CDMA) system. The operation of CDMA system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and incorporated by reference herein. The CDMA system is further disclosed in U.S. Pat. No. 5,103,459, entitled SYSTEM AND METHOD FOR GENERATING SIGNAL WAVEFORMS IN A CDMA CELLULAR TELEPHONE SYSTEM, assigned to the assignee of the present invention, and incorporated by reference herein. Another CDMA system includes the GLOBALSTAR communication system for world wide communication utilizing low earth orbiting satellites. Other wireless telephony systems include time division multiple access (TDMA) systems and frequency division multiple access (FDMA) systems. The CDMA systems can be designed to conform to the "TIA/EIA/IS-95 Mobile Station-Base Station Compatibility Standard for Dual-Mode Wideband Spread Spectrum Cellular System", hereinafter referred to as the IS-95 standard. Similarly, the TDMA systems can be designed to conform to the TIA/EIA/IS-54 (TDMA) standard or to the European Global System for Mobile Communication (GSM) standard.

Encryption of digitized voice data in wireless telephony has been hampered by the lack of computational power in the remote station. This has led to weak encryption processes such as the Voice Privacy Mask used in the TDMA standard or to hardware generated stream ciphers such as the A5 cipher used in the GSM standard. The disadvantages of hardware based stream ciphers are the additional manufacturing cost of the hardware and the longer time and larger cost involved in the event the encryption process needs to be changed. Since many remote stations in wireless telephony systems and digital telephones comprise a microprocessor and memory, a stream cipher which is fast and uses little memory is well suited for these applications.

SUMMARY

Embodiments disclosed herein address the above stated needs by providing an efficient stream cipher which is fast and uses little memory.

In one aspect, a method of generating a key stream comprises applying a cryptographic function on input values selected from a first array of values to generate output values; selecting mask values from a second array of values; and combining the output values with the mask values to generate a key stream block for the key stream; wherein the first and second arrays are finite. The method may further comprise using a linear feedback shift register (LFSR) to generate the first array, wherein the values of the first array correspond to the values of the LFSR states. The second array may be generated by clocking the LFSR. The method may also further comprise applying the cryptographic function on updated input values selected from an updated first array of values to generate updated output values; selecting updated mask values from an updated second array of values; and combining the updated output values with the updated mask values to generate a new key stream block for the key stream. Here, the values of the first array may be set as the values of first LFSR states and the updated first array may be generated by clocking the LFSR. Similarly, the values of the second array may be set as the values of second LFSR states and the updated second array may be generated by clocking the LFSR.

For a value comprising of one or more words, each comprising of two or more bytes, using the LFSR to generate the first array may comprise copying words of a key and words of an initialization vector into the LFSR; performing a byte-wise substitution on at least one byte of a word in the LFSR to generate a corresponding replacement word in the LFSR; mixing at least two bytes of a replacement word in the LFSR; and mixing at least two words in the LFSR to generate the first array.

Applying the cryptographic function may comprise performing a byte-wise substitution of at least one byte of an input value to generate primary intermediate values; and mixing at least two bytes of a primary intermediate value to generate a secondary intermediate value to generate the output values. The byte-wise substitution may comprise performing a nonlinear substitution of the at least one byte. The nonlinear substitution may be performed using a key-dependent Sbox substitution. The mixing of at least two bytes may comprise mixing at least two bytes using a minimum distance separable matrix. The key for the Sbox substitution may be generated based on a secret key of one or more words. The generation of the key may comprises performing a byte-wise substitution of at least one byte of a word of the secret key to generate a corresponding replacement word; and mixing at least two bytes of a replacement word to generate the first key byte.

Applying the cryptographic function may further comprise mixing at least two input values to generate the primary intermediate values. Applying the cryptographic function also may further comprise mixing at least two secondary intermediate values to generate the output values. Here, the mixing may be based on modular arithmetic.

In another aspect, apparatus for generating a key stream comprises means for applying a cryptographic function on input values selected from a first array of values to generate output values; means for selecting mask values from a second array of values; and means for combining the output values with the mask values to generate a key stream block for the key stream; wherein the first and second arrays are finite.

In still another aspect, a machine readable medium used for generating a key stream comprises code segment for applying a cryptographic function on input values selected from a first array of values to generate output values; code segment for selecting mask values from a second array of values; and code segment for combining the output values with the mask values to generate a key stream block for the key stream; wherein the first and second arrays are finite.

In a further aspect, apparatus for generating a key stream comprises a linear feedback shift register (LFSR) configured to generate a first array of values, wherein the values of the first array corresponds to the values of the LFSR states; a nonlinear filter module configured to apply a cryptographic function on input values selected from the first array to generate output values; and a combining module configured to combine the output values with mask values selected from a second array of values to generate a key stream block for the key stream; wherein the first and second arrays are finite.

BRIEF DESCRIPTION OF THE DRAWINGS

Various embodiments will be described in detail with reference to the following drawings in which like reference numerals refer to like elements, wherein:

FIG. 4 shows an example of a fixed Sbox;

FIGS. 7A and 7B show a multiplication table using 0x72C688E8 for a linear feedback shift register;

DETAILED DESCRIPTION

Generally, embodiments describe a stream cipher for use in applications that places severe constraints on the amount of processing power, program space and/or memory available for software encryption algorithms. Voice encryption in wireless telephone is one example of such application. Since most mobile telephones in use incorporate a processor and memory, a software stream cipher that is fast and uses little memory would be ideal. In addition, many techniques used for generating the stream of pseudo-random bits are based on Linear Feedback Shift Registers (LFSRs) over the Galois Finite Field of order 2. However, such ciphers are difficult to implement efficiently on a general purpose processor. Accordingly, the present embodiments also overcome this dilemma by using an LFSR defined over $GF((2^8)^4)$ (which is merely a different isomorphic representation of $GF(2^{32})$) in combination with a number of various techniques to greatly increase the generation speed of the pseudo-random stream in software on a general processor.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

I. Linear Feedback Shift Register

An LFSR is based on a recurrence relation over the Galois field. The output sequence in bits is defined by the following recurrence relation:

$$S_{n+k} = C_{k-1}S_{n+k-1} + C_{k-2}S_{n+k-2} + \cdots + C_1 S_{n+1} + C_0 S_n \qquad (1)$$

where $S_{n+k}$ is the output element, $C_j$ are constant coefficients, k is the order of the recurrence relation, and n is an index in time. The state variables S and coefficients C are elements of the underlying finite field.

Figure 1:
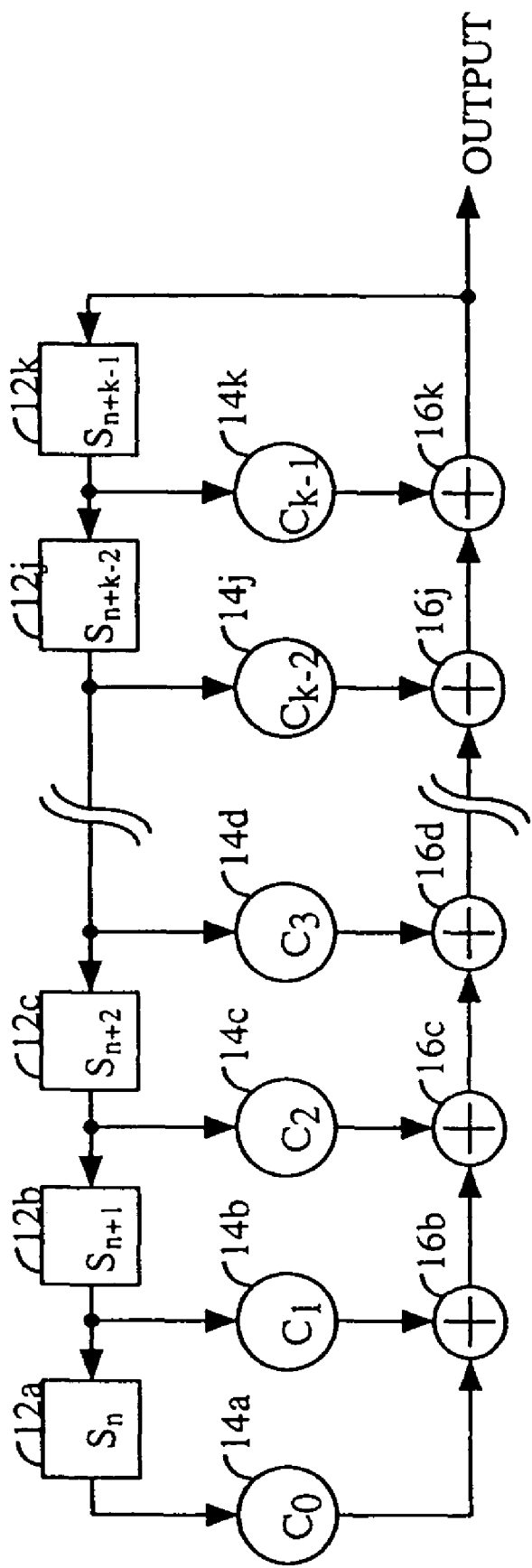
FIG. 1 shows an example implementation of the recurrence relation.

FIG. 1 shows an example implementation of the recurrence relation in equation (1). For a recurrence relation of order k, registers 12a-12k comprise k elements $S_n$ to $S_{n+k-1}$. The elements are provided to Galois field multipliers 14a-14k which multiply the elements with corresponding constants $C_0$-$C_{k-1}$. The resultant products from multipliers 14a-14k are provided to Galois field adders 16b-16k which sum the products to provide the output element. For n=1, the elements of, for example Galois Field of order 2 (GF(2)) comprise a single bit (having a value of 0 or 1) and implementation of equation (1) requires many bit-wise operations. In this case, the implementation of the recurrence relation using a general purpose processor may not be efficient because a processor which is designed to manipulate byte or word sized objects is utilized to perform many operations on single bits.

More particularly, a LFSR may also be represented by its characteristic polynomial $$p_1(x) = x^k + c_{k-1}x^{k-1} + c_{k-2}x^{k-2} + \ldots + c_1 x + c_0 \quad (2)$$

where $p_1(x)$ indicates that multiplication and addition are over $GF(2^1)$. The operations involved, namely shifting and bit extraction, are relatively efficient in hardware but inefficient in software, especially if the length of the shift register exceeds the length of the registers of the processor in question. In addition, only one bit of output is generated for each set of operations, which again is inefficient use of the general purpose processor.

However, LFSRs may operate over various finite fields and can be made more efficient in software by using a finite field more suited to a processor. In one embodiment, a Galois Field with $2^w$ elements ($GF(2^w)$), where w is related to the size of items in the underlying processor is used. Example sizes of items in a processor may be, but is not limited to, 16-bits or 2 bytes, 32-bit words and 64-bit words. Accordingly, the elements of this field and the coefficients of the recurrence relation may occupy one unit of storage and can be efficiently manipulated in software. In the meantime, the order k of the recurrence relation that encodes the same amount of state is reduced by a factor of w.

The field $GF(2^w)$ can also be represented as the modulo 2 coefficients of all polynomials with degree less than w. That is, an element of the field is represented by a w-bit word with bits $(a_{w-1}, a_{w-2}, \ldots, a_1, a_0)$, which represents the polynomial in equation (3) below.

$$a_{w-1}x^{w-1} + a_{w-2}x^{w-2} + \ldots + a_1 x + a_0 \quad (3)$$

The addition operation for such polynomials is simply addition modulo 2 (XOR) for each of the corresponding coefficients. The additive identity is the polynomial with all coefficients 0. Multiplication in the field is polynomial multiplication with modulo 2 coefficients, with the resulting polynomial being reduced modulo an irreducible polynomial of degree w. The multiplicative identity element is $(a_{w-1}, a_{w-2}, \ldots, a_1, a_0) = (0, 0, \ldots, 0, 1)$. Moreover, 8-bit bytes may be used to represent elements of $GF(2^8)$ and 32-bit words may be used to represent degree-3 polynomials of bytes.

Accordingly, a LFSR may be specified in terms of bytes or words instead of bits, and successive output values will also be those units rather than bits. The feedback function is still of the form of equation (1), however the values $s_i$ and the coefficients $c_i$ are elements of $GF(2^w)$, rather than bits, and addition and multiplication are performed over $GF(2^w)$ as described above. Cycling or clocking the LFSR requires a number of constant multiplication operations followed by XOR of these terms. It is to be noted that multiplication by 0 simply means ignoring the corresponding element of the register, while multiplication by 1 requires no computation, as the output (of the multiplication) is the same as the input. Thus, to enable an efficient implementation, the multiplication constants, $c_i$, are chosen to be 0 or 1 most of the time.

The LFSR over the field $GF(2^w)$ is mathematically equivalent to w parallel shift registers over GF(2), each of length equivalent to the total state w, each with the same recurrence relation but different initial state. Let the polynomial $p_1(x)$ represent the LFSR over GF(2). This configuration makes updating a LFSR efficient when the LFSR has a maximum length period and when approximately half of the coefficients of $p_1(x)$ are 1. For example, the period has a maximum length of $2^{17w}$ when p(x) is a primitive polynomial of degree 17.

Furthermore, the LFSR stream is not used in its entirety. To cycle the LFSR, elements $s_n, \ldots, s_{n+16}$ are used. After n cycles of the LFSR, the elements $s_n, \ldots, s_{n+16}$ are preserved and the values of these elements are called the state of the register. The state of the register corresponding to the elements $s_n, \ldots, s_{n+16}$ at any given instant in time is denoted $r_0, \ldots, r_{16}$. When the LFSR is cycled, the values in positions $r_0, r_4$, and $r_{15}$ ($s_n, s_{n+4}$ and $s_{n+15}$) are used to determine $s_{n+17}$. The values in positions $r_0, \ldots, r_{16}$ are shifted to the positions $r_0, \ldots, r_{15}$ respectively (that is, $r_i = r_{i+1}$, $15 \geq i \geq 0$) and $r_{16}$ is set to the value of $s_{n+17}$. A nonlinear filter then uses the values in the register as input to the nonlinear function, as will be described below.

Figure 2:
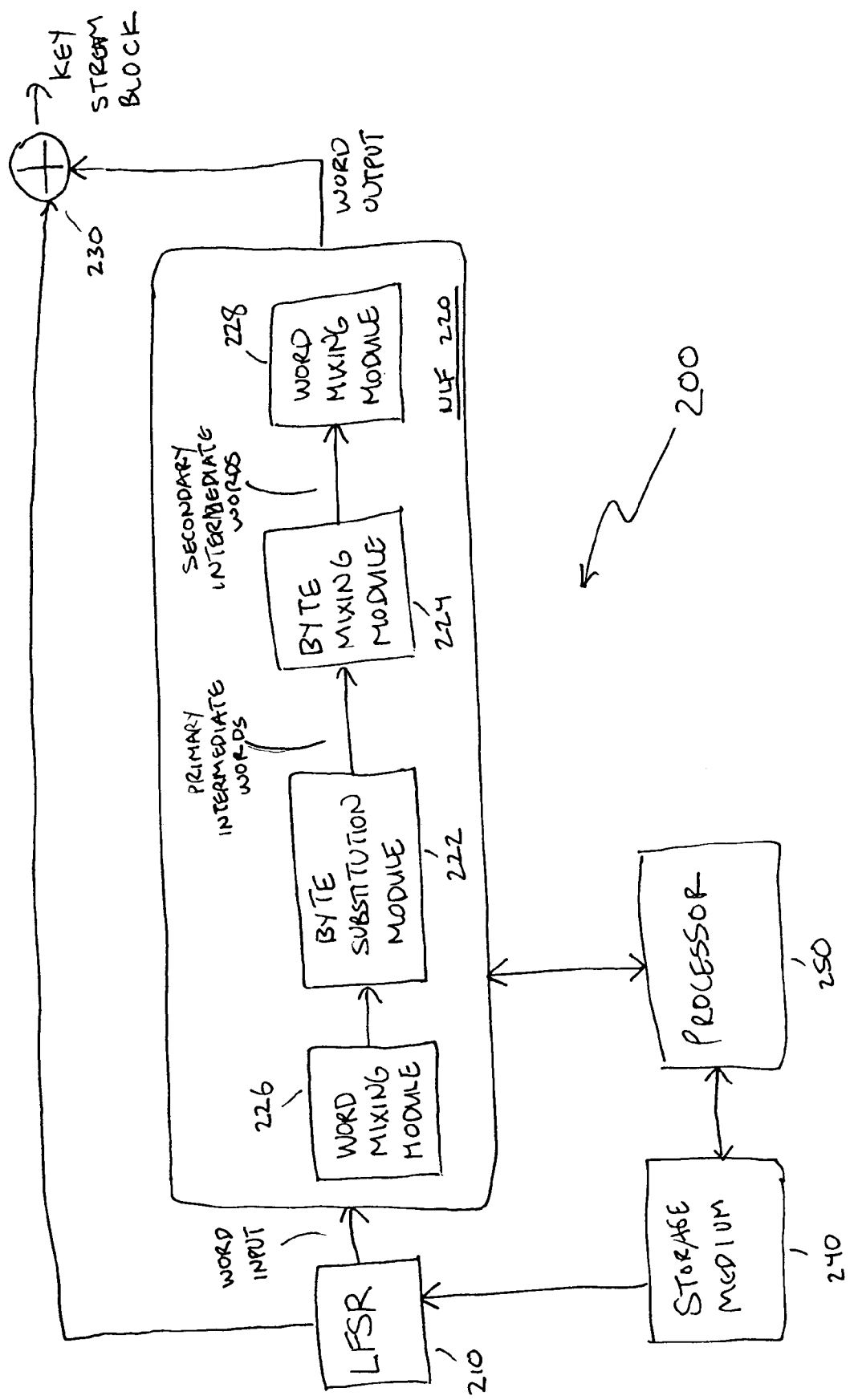
FIG. 2 shows an example apparatus for generating a key stream.

II. Apparatus Implementing Stream Cipher in Accordance with the Present Invention FIG. 2 shows an example apparatus 200 implementing a stream cipher for generating a key stream. Apparatus 200 may comprise a LFSR 210, a nonlinear filter (NLF) module 220, a combining module 230 and a storage medium 240. LFSR 210 is configured to generate a first array of values, wherein the values of the first array corresponds to the values of the LFSR states. NLF module 220 is configured to apply a cryptographic function on input values selected from the first array to generate output values. Combining module 230 is configured to combine the output values with mask values selected from a second array of values. The resultant words output from combining module 230 may then be used to generate a key stream block for the key stream. Apparatus 200 may also comprise a processor 250 configured to control one or more of LFSR 210, NLF module 220, combining module 230 and storage medium 240. Here, the first and second arrays are finite.

It is to be noted that a value of an array may represent various bit units. However, for purpose of explanation, a bit unit of a word with one or more bytes will be used to describe the embodiments. In such case, LFSR 210 generates a first array of words, NLF module 220 applies a cryptographic function on input words selected from the first array to generate output words, and combining module 230 combines the output words with mask words selected from a second array of words to generate a key stream block for the key stream.

NLF module 220 may comprise a byte substitution module 222 configured to perform byte wise substitution of at least one byte of an input word to generate primary intermediate words, and a byte mixing module 224 configured to mix at least two bytes of a primary intermediate word to generate a secondary intermediate word. NLF module 220 may further comprise a word mixing module 226 and a word mixing module 228. Word mixing module 226 is configured to mix at least two input words based on modular arithmetic to generate the primary intermediate words. Word mixing module 228 is configured to mix at least two secondary intermediate words based on modular arithmetic to generate the output words.

In apparatus 200, a portion or more of LFSR 210, NLF module 220, combining module 230 and storage medium 270 may be implemented together. For example, word mixing modules 226 and 228 may be implemented together. Moreover, a portion or more of apparatus 200 may be implemented by hardware, software, firmware, middleware, microcode, or any combination thereof. When implemented in software, firmware, middleware or microcode, the program code or code segments to perform the necessary tasks may be stored in a machine readable medium such as storage medium 240 or in a separate storage(s) not shown. A processor such as processor 250 may perform the necessary tasks. A code segment may represent an instruction, procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, it should be apparent to those skilled in the art that the elements of apparatus 200 may be rearranged without affecting the operation. The details of apparatus 200 will be described with reference to FIG. 3 below.

Figure 3:
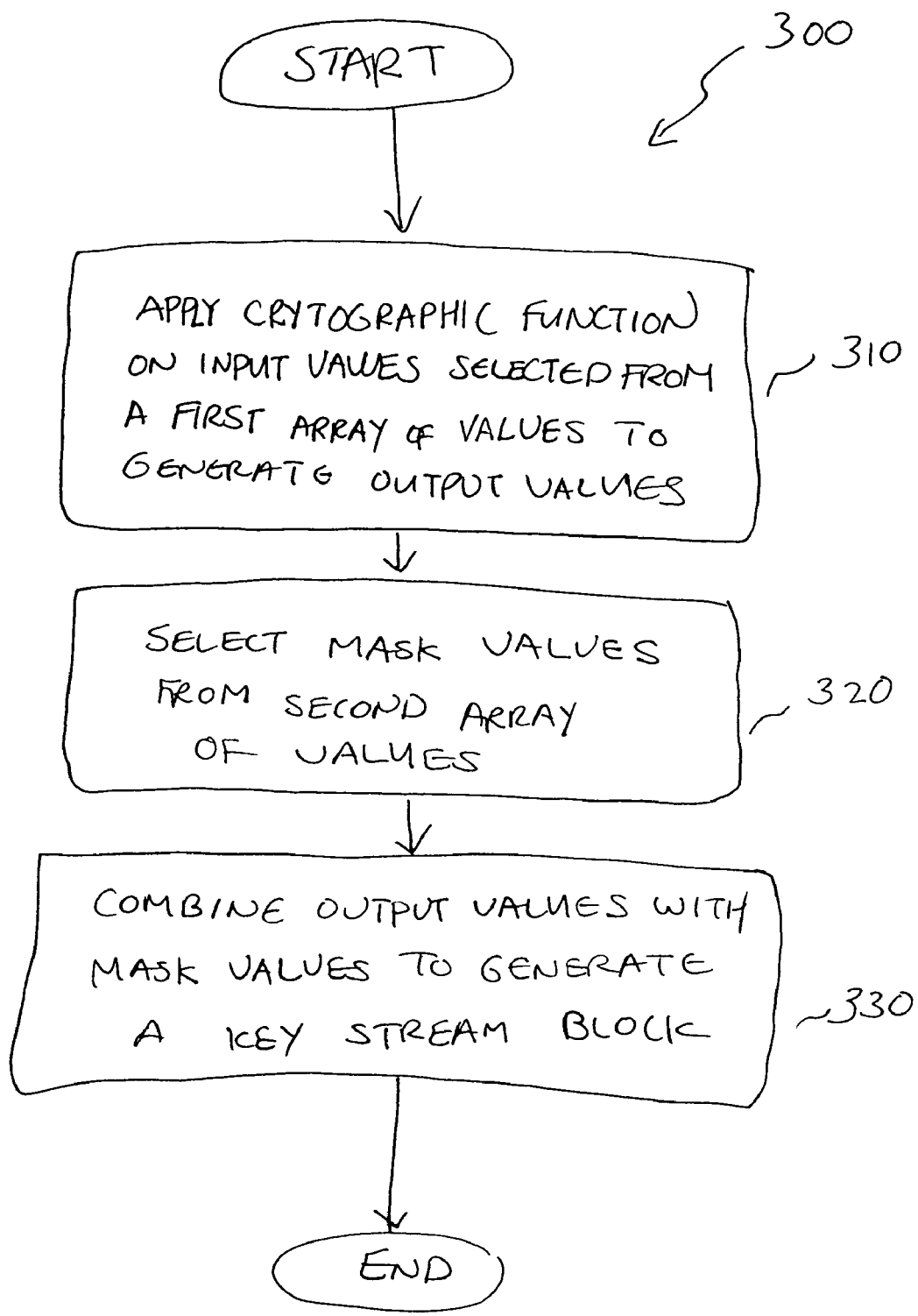
FIG. 3 shows an example method for generating a key stream.

FIG. 3 shows a method 300 for generating a key stream. To generate the key stream, a cryptographic function is applied on input values selected from a first array of values to generate output values (310). Mask values are selected from a second array of values (320) and the output values are combined, i.e. XOR operated, with the mask values (330). Here, the first and second arrays are finite. The number of input values and the number of output values are also typically equal. In addition, the second array may be generated from the first array, and each of the first and/or second array may comprise seventeen values.

The resultant combination of the output values and the mask values are then used to generate a key stream block for the key stream. Multiple key stream blocks may be generated as necessary by repeating process 310 to 330. For example, a cryptographic function may be applied on updated or new input values selected from an updated first array of values to generate updated output values, updated mask values may be selected from an updated second array of values, and the updated output values may then be combined with the updated mask values. In method 300, LFSR 210 may be used to generate either one or both the first array and the updated first array, wherein the values of the first array correspond to the values of LFSR states. The second array and/or updated second array may be generated by cycling or clocking LFSR 210. Alternatively, the values of the second array may be set as the values of LFSR states and the updated second array may be generated by clocking LFSR 210.

Assuming that the unit of a value in an array is a word, applying the cryptographic function may include performing a byte-wise substitution of at least one byte of an input word to generate primary intermediate words, and mixing at least two bytes of a primary intermediate word to generate a secondary intermediate words to generate the output words. Here, byte substitution module 222 may perform the byte-wise substitution and byte mixing module 224 may perform the byte mixing.

More particularly, the byte-wise substitution of a byte may comprise performing a nonlinear substitution of the byte. For example, a key-dependent Sbox substitution may be performed on the byte. S-box is a term for a nonlinear function often implemented as a table lookup. These S-boxes are based in turn on a fixed m×m permutation S-box, iterated with the data modified by variables derived during a secret key setup. A fixed S-box will be referred to as Sbox[.]. An example of a fixed 8×8 permutation S-box having a nonlinearity of 104 is shown in FIG. 4.

Figure 5:
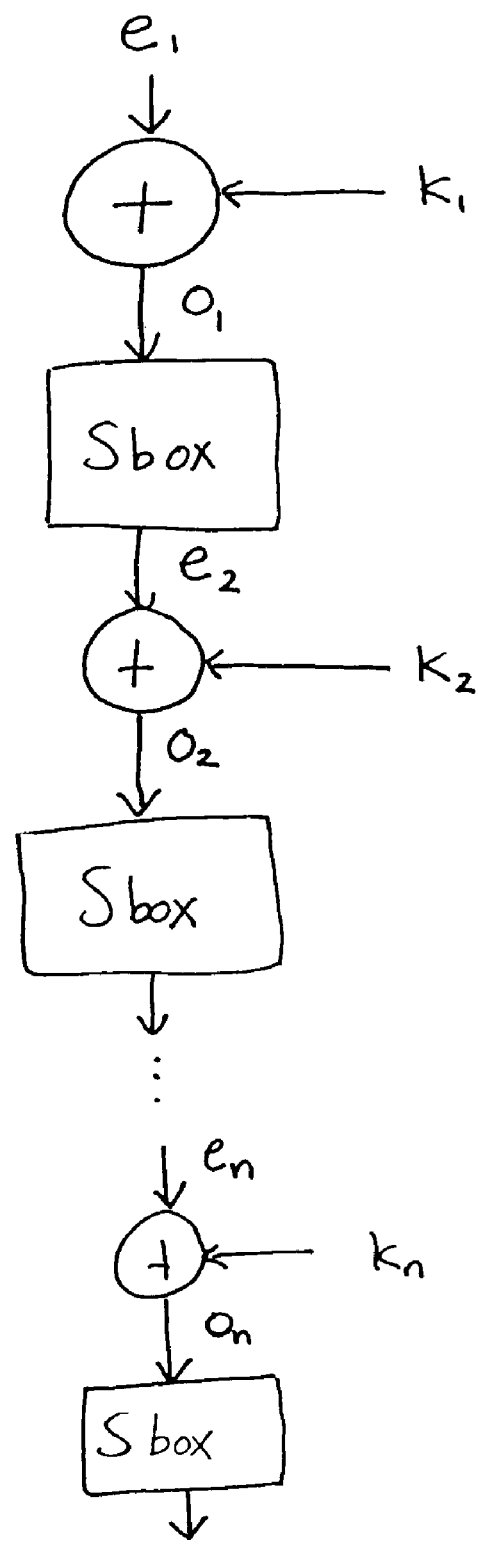
FIG. 5 shows an example of a key dependent Sbox substitution.

Key-dependent Sbox substitution generally involves combining the byte to be substituted with a first key to generate a first combined byte and substituting the first combined byte with a byte value from a pre-determined or pre-calculated array. FIG. 5 shows an example of a key-dependent Sbox substitution. As shown, a byte to be substitute $e_1$ is combined or XOR operated with a first key byte $k_1$. The resultant byte $o_1$ serves as an index used to select a byte value from the Sbox that will substitute $o_1$. The replacement byte $e_2$ is combined with a second key byte $k_2$ and the resultant $o_2$ is substituted with a byte value from the Sbox as described. The combining and substitution may be repeated as necessary. The key bytes are derived from a secret key stream and will be discussed below in Section V.

The mixing of at least two bytes of the primary intermediate words may comprise mixing at least two bytes using a minimum distance separable (MDS) matrix multiplication. Referring to FIG. 2, the mixing may be performed by byte mixing module 224. Also, the minimum distance separable matrix multiplication typically comprises operations over a Galois Field comprising 256 elements. An example MDS matrix is discussed below in Section IV.

Applying the cryptographic function in process 310 may further comprise mixing at least two input words to generate the primary intermediate values. Similarly, applying the cryptographic function may further comprise mixing at least two secondary intermediate words to generate the output values. The mixing may be based on modular arithmetic. More particularly, the mixing of the input words may comprise adding selected input words to generate a mixed word and adding the mixed word with each input word to generate the primary intermediate words. Word mixing module 226 may perform the mixing of the input words. The mixing of secondary intermediate words may comprise adding the secondary intermediate words to generate a mixed word and adding the mixed word with each secondary intermediate word to generate the output words. Word mixing module 228 may perform the mixing of the secondary intermediate words. In some embodiments, a Pseudo Hadamard Transform may be used to mix the input items as described below.

IV. Example Embodiment Implementing a Stream Cipher

Figure 6:
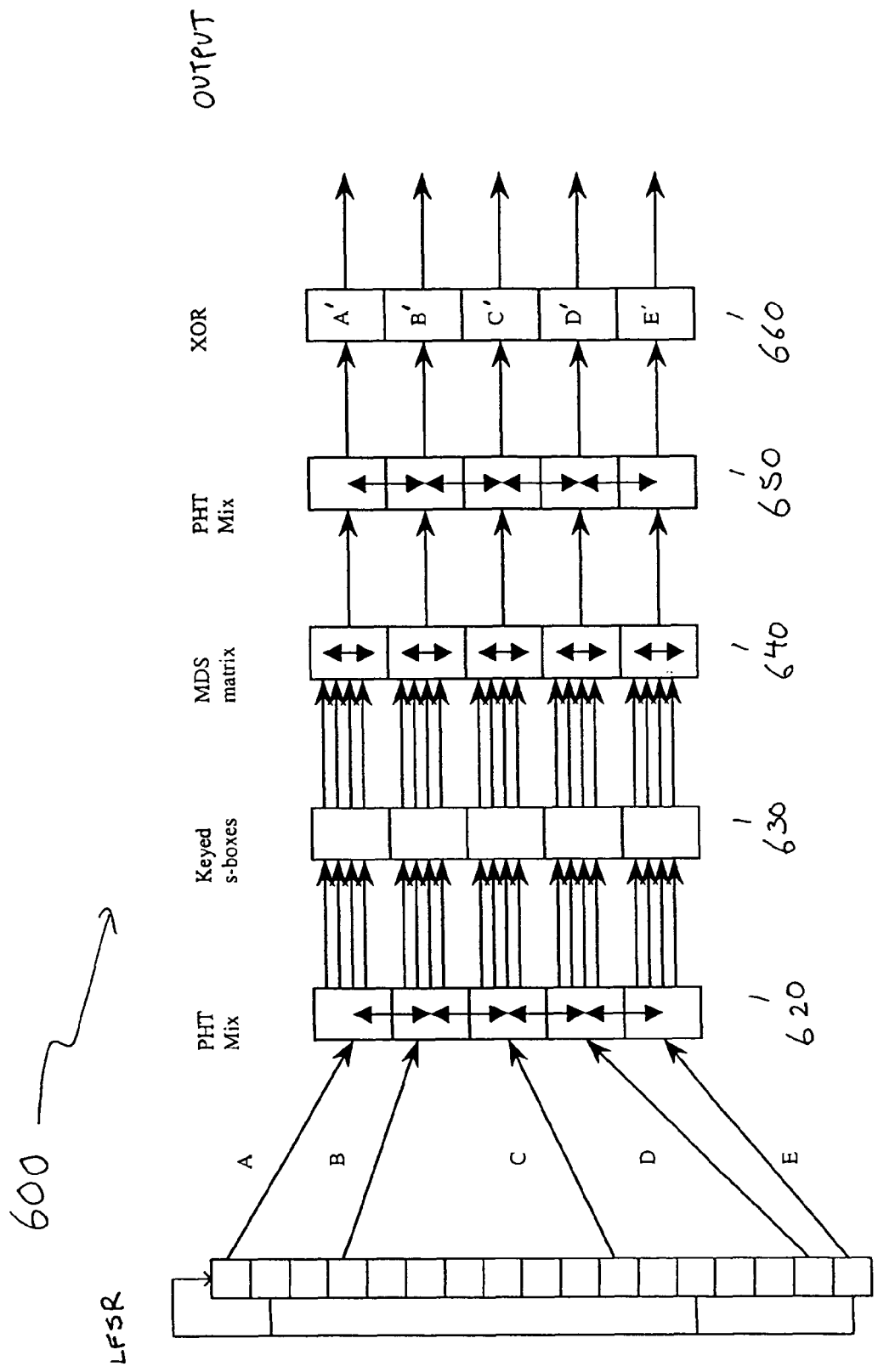
FIG. 6 shows an example apparatus for generating a key stream using five input words.

FIG. 6 shows an example embodiment 600 for generating a key stream using five selected input words. Embodiment 600 involves mixing words {A, B, C, D, E} selected from a LFSR 610 by a Pseudo-Hadamard Transform 620, substitution of bytes by a keyed S-box substitution 630, mixing of words by a MDS matrix multiplication 640, mixing of the words again by a Pseudo-Hadamard Transform 650, and combining the original input words by XOR 660. The component of embodiment 600 that is nonlinear is S-box substitution 630. However, additional nonlinearity also comes from the combination of the operations of addition modulo 232 and XOR 660 because while each of these operations is linear in its respective mathematical group, each is nonlinear in the other's group.

Assume $\beta$, bytes, represents the Galois finite field $GF(2^8)$ represented modulo the irreducible polynomial $z^8+\kappa_7 z^7+\gamma_6 z^6+\gamma_5 z^5+\gamma_4 z^4+\gamma_3 z^3+\gamma_2 z^2+\gamma_1 z+\gamma_0$, where the $\gamma_1$ are bits, specifically $z^8+z^6+z^3+z^2+1$. The constant $\beta_0$=0xE8 represents the polynomial $z^7+z^6+z^5+z^3$ for example. Also, assume W, words, represents the Galois finite field $GF(B^4)$ represented modulo the irreducible polynomial $y^4+\beta_3 y^3+\beta_2 y^2+\beta_1 y+\beta_0$, where the $\beta_i \in B$ are bytes, specifically $y^4+0x72.y^3+0x.C6.y^2+0x88.y+0xE8$. The element $\alpha$ used below is the polynomial y. LFSR 610, then may comprise of 17 32-bit words, with characteristic polynomial $x^{17}+x^{15}+x^4+\alpha$, where $\alpha \in W$ is the polynomial y.

Having defined such relation, LFSR 610 may be implemented more efficiently because the constant $\alpha$ is relatively simple. Multiplication by $\alpha$ involves shifting the word left by 8 bits, and adding (XOR) a precomputed constant from a table indexed by the most significant 8 bits. For example, in the computer language C, calculating a new word to be inserted in LFSR 610 is as follows.

```
new = R[15]^R[4]^(R[0] << 8) ^Multab[R[0] >> 24];
    with the precomputed table:
        /* Multiplication table using 0x72C688E8 */
        unsigned long Multab[256] shown in FIGS. 7A and 7B.
LFSR 610 can then be updated if necessary as follows.
    R[0] = R[1]; R[1] = R[2]; ... ; R[16]= R[17]; R[17] = new;
```

After updating LFSR 610, five words from the LFSR states are selected for input to the nonlinear filtering process. These are $r_{17}, r_{13}, r_6, r_1, r_0$, referred to as A, B, C, D, E. These tap positions form a "full positive difference set," such that as words move through the register and are selected as input to the nonlinear filtering process, no pair of words is used more than once.

The selected input words {A, B, C, D, E} are mixed by Pseudo Hadamard Transform 620. More particularly, the operation mixes words, using addition modulo $2^{32}$, and further mixes an arbitrary number of words. For example, the five words may be mixed by the matrix multiplication as follows.

$$\begin{bmatrix} A \\ B \\ C \\ D \\ E \end{bmatrix} = \begin{bmatrix} 2 & 1 & 1 & 1 & 1 \\ 1 & 2 & 1 & 1 & 1 \\ 1 & 1 & 2 & 1 & 1 \\ 1 & 1 & 1 & 2 & 1 \\ 1 & 1 & 1 & 1 & 1 \end{bmatrix} \begin{bmatrix} A \\ B \\ C \\ D \\ E \end{bmatrix}$$

In the above matrix multiplication, all diagonal entries are 2 except the last diagonal entry is 1. This may for example be implemented in a program language as follows:

$E = A+B+C+D+E;$ $A+=E; B+=E; C+=E; D+=E;$

After mixing words as described, a keyed sbox substitution 430 is performed. In one embodiment, four logically independent S-boxes may be used. In such case, sbox substitution would involve four rounds of combination and substitution as described with reference to FIG. 5. More particularly, the four keyed S-boxes $S_i$ ($0 \leq i \leq 3$) may be derived from a fixed one in the following manner:

$S_i(x) = Sbox[K_{i,N-1} \oplus Sbox[K_{i,N-2} \oplus \ldots Sbox[K_{i,0} \oplus x] \ldots ]]$ where $\oplus$ is the XOR operator, and N is the number of words in a key. The byte values $K_{ij}$ are derived from the secret key in a manner described below.

After the bytes have been processed by the keyed S-boxes 640, the four bytes in each word are mixed by MDS matrix 650 multiplication. The bytes of a word and of the MDS matrix are treated as elements of B. An example of the MDS matrix is as follows:

```
unsigned char MDS [4][4] = {

{2, 3, 1, 1},

{1, 2, 3, 1},

{1, 1, 2, 3},

{3, 1, 1, 2}

}
```

The values "2" represent the polynomial "z", and "3" represents the polynomial "z+1". The resulting words are again mixed by Pseudo Hadamard Transform 650. A key stream block is then generated by combining the mixed words with another five input words {A', B', C', D', E'}. Here, A', B', C', D', E' may be new input words selected from LFSR 610. Alternatively, A', B', C', D', E' may be new input words selected from an updated LFSR 610 by clocking LFSR 610.

The first four operations of the nonlinear filter are invertible. In particular, the effect of the MDS matrix multiplication and the second PHT stage are unkeyed and may be known to an attacker. XORing the input words to the output has two effects. First, it makes the output not a strict permutation of the input, that is, a pseudo-random function instead of a pseudo-random permutation. Second, these XOR operations "lock in" the mixing of the two stages mentioned above, since an attacker needs to remove the effects of these words before being able to reverse these mixing rounds.

The five words produced by this processing are used as the output keystream. The order {A . . . E} may be from most significant byte of each word first. Accordingly, a key stream block may be generated.

It is to be noted that if sufficient storage medium is available, the operations of the four keyed S-boxes and the subsequent MDS matrix multiplication can be precalculated at the time of key setup, resulting in four tables, one for each byte of the input word. The output word is calculated by XORing the 4 32-bit table entries thus selected. Since many current high-end processors allow multiple instructions to execute at once, if the instructions are sufficiently independent. Note also that the operations in embodiment 600 may be performed in parallel, allowing very good performance on processors. Moreover, similar to apparatus 200, a portion or more of embodiment 600 may be implemented by hardware, software, firmware, middleware, microcode, or any combination thereof.

V. Key Loading and Initialization Vector

Generation of a key stream as described above may also involve secret key and Initialization Vector (IV). For purposes of explanation, a bit unit or a word with two or more bytes will be used to describe both key loading and IV loading process. In such case, a secret key and IV may be presented as a byte stream and may be converted to 32-bit words in the most significant byte first (big-endian) representation. The secret key and IV are then multiples of 4 bytes each. The minimum size of the key may be 32 bits while the maximum key size may be set to, for example, 320 bits. The minimum size of the IV may be zero while the maximum size of the IV is determined by the key length, such that the sum of the key length and IV length is no more than, for example, 12 words (384 bits). The size of the IV may also vary. Different key/IV length combinations will generate distinct output streams. No more than $2^{64}$ (160-bit) blocks of output should be generated using any one key/IV combination.

Figure 8:
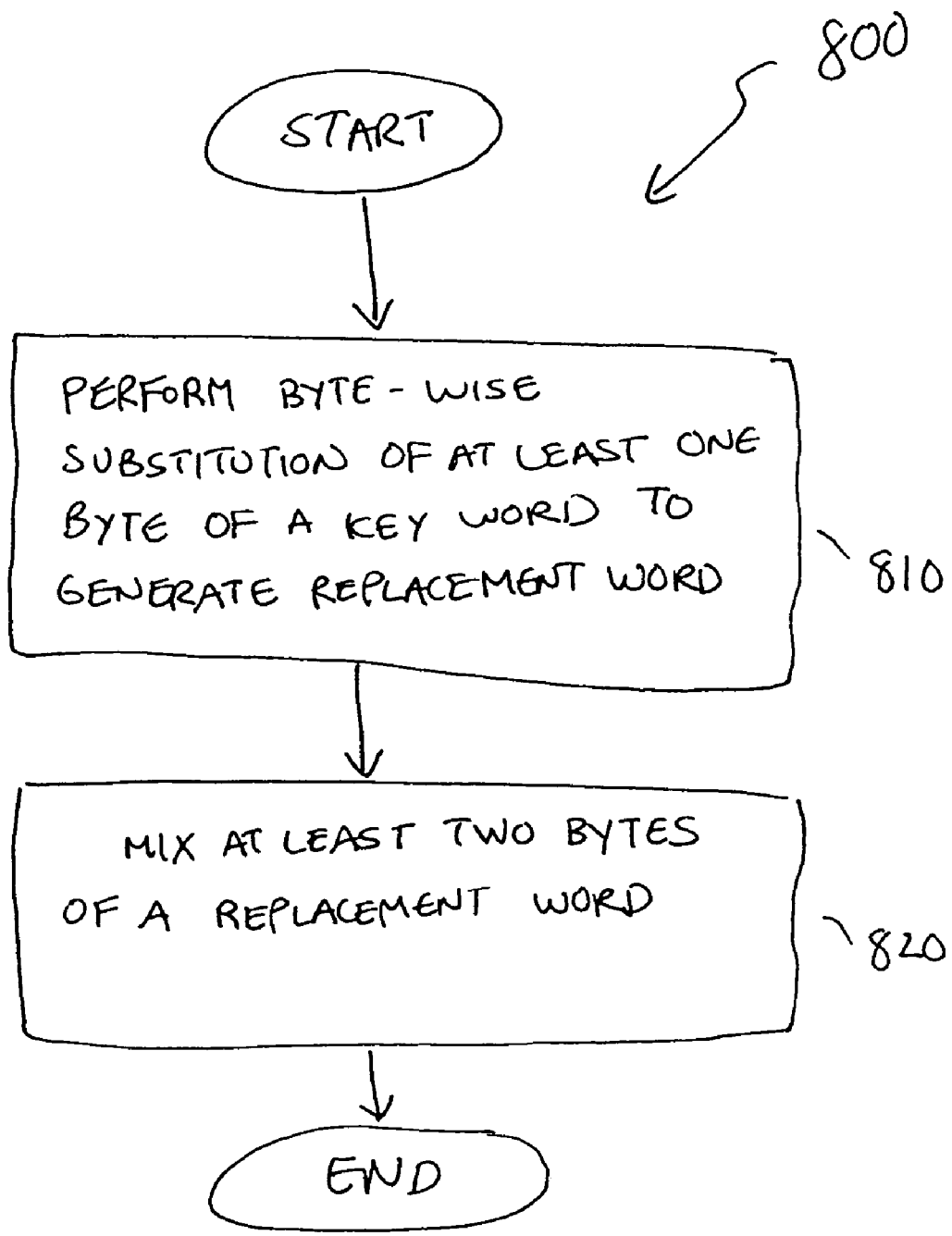
FIG. 8 shows an example key loading method.

FIG. 8 shows an example key loading method 800 for a secret key of one or more words. In method 800, a byte-wise substitution of at least one byte of a key word is performed to generate replacement words (810). At least two bytes of a replacement word is then mixed to generate an encrypted key (820). Here, the byte-wise substitution may be performed by byte substitution module 222 or by a separate module (not shown). Similarly, the byte mixing may be performed by byte mixing module 224 or by a separate module (not shown). Also, the original secret key and the encrypted key may be stored in storage medium 240.

More particularly, key loading process mixes the key bytes through a fixed Sbox and MDS processes to ensure that all or nearly all bytes of the key affect four of the keyed S-boxes. For each word of the key, the bytes are substituted through the fixed Sbox, then the resulting word is mixed by the MDS matrix multiplication. The resulting words or the encrypted words are stored for subsequent use as described above. The resulting words may occupy the same amount of space as the original key, which is no longer needed. Namely, these resulting words are used in the key-dependent S-box substitution as described with reference to FIG. 5, and also during the IV loading process as described below to initialize a LFSR. The bytes K discussed above are the bytes of these stored words; the j index ($0 \leq j < N$, where N is the number of words of the key) locates the word of the stored mixed key, while the i index ($0 \leq i \leq 3$) is the byte of the word, with the byte numbered 3 being the most significant byte.

If the faster implementation is desired, the effect of the keyed S-boxes followed by the MDS matrix multiplication can be computed into four tables, each with 256 32-bit entries. The combined operations then consist of four byte-index table lookups and four word XOR operations. Also, key-loading stage may be implemented as described or by various other known techniques. Alternatively, for embedded applications with a secret key fixed in read-only memory, a high quality cryptographic key may be used directly as if it was the output of the key loading stage.

Figure 9:
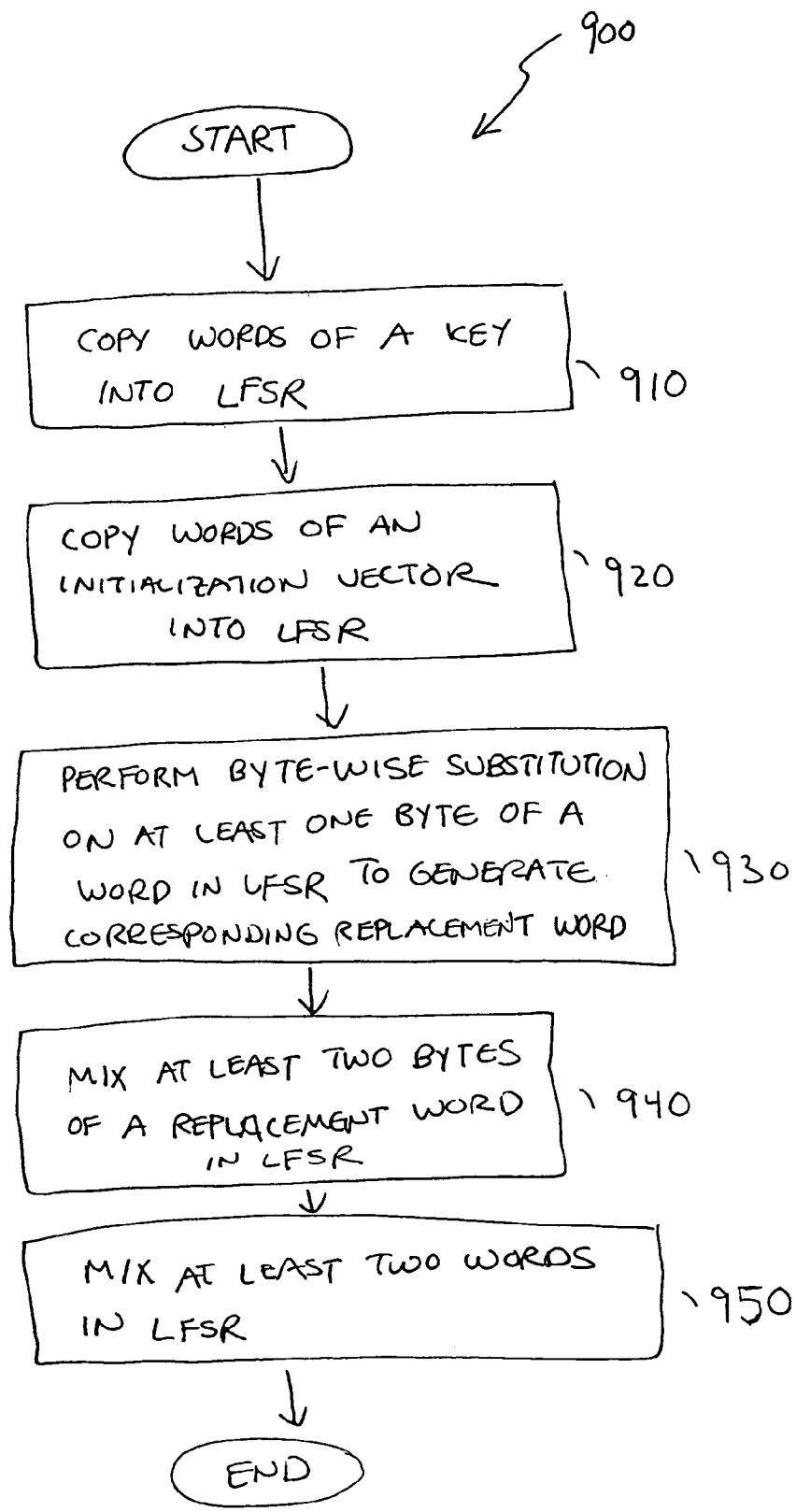
FIG. 9 shows an example IV loading method.

The IV loading process initializes a LFSR with values derived from a non-linear mixing of the key and the IV. FIG. 9 shows an example IV loading method 900. For purposes of explanation, let L be the length (in words) of the key, and I be the length in words of the IV. The encrypted key, generated by above by key loading, or the original key, if there no key loading is performed, is copied into the first L words of the LFSR (910). The L words is then followed by the I words of the IV (920). A byte-wise substitution is performed on the words in the LFSR to generate replacement words (930) and at least two bytes of a replacement word is mixed to generate initial LFSR words (940). Two initial words may then be mixed to generate an array of words from input words are selected (950). Here, the byte-wise substitution may be performed by byte substitution module 222 or by a separate module (not shown). Similarly, the byte mixing may be performed by byte mixing module 224 or by a separate module (not shown), and the initial word mixing may be performed by either word mixing module 226 or 228 or by a separate module (not shown). Also, the IV may be stored in storage medium 240.

More particularly, the words are processed using the fixed S-box and MDS matrix multiplication as in the key loading process above. (Note that the fixed S-box is used to avoid undesirable interactions since the keyed S-boxes use the same key bytes.) For example, for a LFSR having 17 states, the next word of the shift register is initialized based on L and I, as follows:

$$R[L+I]=((L<<4)+I)*0x01010101;$$

That is, each byte of that word is initialized to (16L+I). This word is passed through the keyed S-boxes and MDS matrix multiplication as would be done in normal operation of the cipher. Generally, this will result in distinct values of the bytes of this word.

The remaining (17−L−I−1) words of the register are filled by adding the word immediately previous word (L+I), then processing the resulting word with the keyed S-boxes and MDS matrix multiplication. For example, if L is 4 (a 128-bit key) and I is 2 (64-bit IV), $r_6$ would be filled with the value 0x42424242 before being processed by the keyed S-boxes and MDS matrix multiply. Then $r_7$ would be set to $r_6+r_0$, and mixed by the keyed S-boxes and MDS matrix multiply. Similarly $r_8$ would be set to $r_7+r_1$, and mixed by the keyed S-boxes and MDS matrix multiply, and so on until $r_{16}$ is set to $r_{15}+r_9$ and mixed.

Once the LFSR has been filled with data, the contents may be mixed with a 17-word-wide PHT. Key stream generation can then begin as described above.

VI. Conclusion

Therefore, an efficient stream cipher is disclosed. More particularly, the stream cipher combines an LFSR generator with a keyed mixing function reminiscent of a block cipher round. Also, embodiments use native processor operations on word-sized data items, but is expected to accept keys which are simply strings of bytes, and to produce a stream of bytes as output for encryption purposes. This means that a translation between native byte ordering and external byte ordering may be needed to ensure compatibility between implementations running on different processors. Since most Internet standards are defined using "big-endian" byte ordering, in which the most significant byte of a multi-byte quantity appears first in memory, embodiments may use this "big-endian" byte ordering. On "little-endian" machines, the bytes of the key and IV must be assembled into words, and the words of the output stream must be byte reversed before being XORed into the buffer.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method of generating a key stream by an apparatus comprising:

selecting at least five input words from a first array of words by a non-linear filter module, wherein each input word comprises two or more bytes;

mixing at least two words of the at least five input words to generate at least five primary mixed words by the non-linear filter module;

performing a byte-wise substitution of at least one byte of each of the five primary mixed words to generate, respectively, at least five primary intermediate words by the non-linear filter module;

mixing at least two bytes of each of the at least five primary intermediate words to generate, respectively, at least five secondary intermediate words by the non-linear filter module;

mixing at least two words of the at least five secondary intermediate words to generate at least five output words by the non-linear filter module;

selecting at least five mask words from a second array of words by a linear feedback shift register; and combining the at least five output words with the at least five mask words to generate a key stream block for the key stream by a combining module;
wherein the first and second arrays are finite.

2. The method of claim 1, further comprising: generating the second array from the first array.

3. The method of claim 2, further comprising: using the linear feedback shift register (LFSR) to generate the first array, wherein the words of the first array correspond to LFSR states.

4. The method of claim 3, further comprising: clocking the LFSR to generate the second array.

5. The method of claim 3, wherein using the LFSR to generate the first array comprises:
copying words of a key and words of an initialization vector into the LFSR;
performing a byte-wise substitution on at least one byte of a word in the LFSR to generate a corresponding replacement word in the LFSR;
mixing at least two bytes of a replacement word in the LFSR; and
mixing at least two words in the LFSR to generate the first array.

6. The method of claim 1, further comprising:
selecting updated input words from an updated first array of words for generating updated output words;
selecting updated mask words from an updated second array of words; and
combining the updated output words with the updated mask words to generate a new key stream block for the key stream.

7. The method of claim 6, further comprising: setting the words of the first array based on first linear feedback shift register (LFSR) states; and clocking the LFSR to generate the updated first array.

8. The method of claim 6, further comprising: setting the words of the second array based on second LFSR states; and clocking the LFSR to generate the updated second array.

9. The method of claim 1, wherein the number of input words and the number of output words are equal.

10. The method of claim 1, wherein the first and second array each comprises seventeen words.

11. The method of claim 1, wherein performing the byte-wise substitution of at least one byte comprises: performing a nonlinear substitution of the at least one byte.

12. The method of claim 11, wherein performing the nonlinear substitution of the at least one byte comprises: performing a key-dependent Sbox substitution on the at least one byte.

13. The method of claim 12, wherein performing the key-dependent Sbox substitution of the at least one byte comprises:
combining a first key byte with the at least one byte to generate a first combined byte; and
substituting the first combined byte with a byte value from a pre-determined array.

14. The method of claim 13, further comprising: generating the first key byte based on a secret key of one or more words.

15. The method of claim 14, wherein generating the first key comprises:
performing a byte-wise substitution of at least one byte of a word of the secret key to generate a corresponding replacement word; and
mixing at least two bytes of a replacement word to generate the first key byte.

16. The method of claim 13, wherein performing the key dependent Sbox substitution further comprises:
combining a second key byte with the substituted first combined byte to generate a second combined byte; and
substituting the second combined byte with a byte value from the predetermined array.

17. The method of claim 1, wherein mixing at least two bytes of each of the at least five primary intermediate words comprises: mixing at least two bytes using a minimum distance separable matrix multiplication.

18. The method of claim 17, wherein the minimum distance separable matrix multiplication comprises operations over a Galois Field comprising 256 elements.

19. The method of claim 1, wherein mixing at least two of the at least five input words comprises: mixing the at least two input words based on modular arithmetic.

20. The method of claim 19, wherein mixing at least two input words comprises:
adding the input words to generate a first primary mixed word corresponding to a first input word; and
adding the first primary mixed word with a second input word to generate a second primary mixed word corresponding to the second input word.

21. The method of claim 1, wherein mixing at least two words of the at least five secondary intermediate words comprises: mixing at least two secondary intermediate words based on modular arithmetic.

22. The method of claim 21, wherein mixing at least two of the at least five secondary intermediate words comprises:
adding the secondary intermediate words to generate a first secondary mixed word, wherein the first secondary mixed word is an output word corresponding to a first secondary intermediate word; and
adding the secondary mixed word with a second secondary intermediate word to generate an output word corresponding to the second secondary intermediate word.

23. Apparatus for generating a key stream comprising:
means for selecting at least five input words from a first array of words, wherein each input word comprises two or more bytes;
means for mixing at least two words of the at least five input words to generate at least five primary mixed words;
means for performing a byte-wise substitution of at least one byte of each of the five primary mixed words to generate, respectively, at least five primary intermediate words;
means for mixing at least two bytes of each of the at least five primary intermediate words to generate, respectively, at least five secondary intermediate words;
means for mixing at least two words of the at least five secondary intermediate words to generate at least five output words;
means for selecting at least five mask words from a second array of words; and
means for combining the at least five output words with the at least five mask words to generate a key stream block for the key stream; wherein the first and second arrays are finite.

24. The apparatus of claim 23, further comprising: means for generating the second array from the first array.

25. The apparatus of claim 23, further comprising:
means for selecting updated input words from an updated first array of words for generating updated output words;
means for selecting updated mask words from an updated second array of words; and means for combining the updated output words with the updated mask words to generate a new key stream block for the key stream.

26. The apparatus of claim 23, wherein the number of input words and the number of output words are equal.

27. The apparatus of claim 23, wherein the means for performing byte-wise substitution comprises: means for performing a key-dependent Sbox substitution on the at least one byte.

28. The apparatus of claim 23, wherein the means for mixing at least two bytes of each of the at least five primary intermediate words comprises: means for mixing at least two bytes using a minimum distance separable matrix multiplication.

29. The apparatus of claim 23, wherein the means for mixing at least two words of the at least five input words is based on modular arithmetic to generate the at least five primary mixed words.

30. The apparatus of claim 23, wherein the
means for mixing at least two words of the at least five secondary intermediate words is based on modular arithmetic to generate the output words.

31. A non-transitory storage medium having one or more stored instructions for generating a key stream, which when executed by a machine, causes the machine to perform operations comprising:
selecting at least five input words from a first array of words, wherein each input word comprises two or more bytes;
mixing at least two words of the at least five input words to generate at least five primary mixed words;
performing a byte-wise substitution of at least one byte of each of the five primary mixed words to generate, respectively, at least five primary intermediate words;
mixing at least two bytes of each of the at least five primary intermediate words to generate, respectively, at least five secondary intermediate words;
mixing at least two words of the at least five secondary intermediate words to generate at least five output words;
selecting at least five mask words from a second array of words; and
combining the at least five output words with the at least five mask words to generate a key stream block for the key stream;
wherein the first and second arrays are finite.

32. The medium of claim 31, further comprising one or more instructions to cause the machine to perform operations comprising: generating the second array from the first array.

33. The medium of claim 31, wherein performing the byte-wise substitution comprises: comprises one or more instructions to cause the machine to perform operations comprising: performing a key-dependent Sbox substitution on the at least one byte.

34. The medium of claim 31, wherein mixing at least two bytes of each of the at least five primary intermediate words comprises one or more instructions to cause the machine to perform operations comprising: mixing at least two bytes using a minimum distance separable matrix multiplication.

35. The medium of claim 31, wherein mixing at least two words of the at least five input words is based on modular arithmetic to generate the at least five primary mixed words.

36. The medium of claim 31, wherein mixing at least two words of the at least five secondary intermediate words is based on modular arithmetic to generate the output words.

37. Apparatus for generating a key stream comprising:
a linear feedback shift register (LFSR) configured to generate a first array of words, wherein the words of the first array corresponds to the values of the LFSR states;
a nonlinear filter module configured to select at least five input words from the first array of words, wherein each input word comprises two or more bytes;
a first word mixing module configured to mix at least two words of the at least five input words to generate at least five primary mixed words;
a byte substitution module configured to perform byte-wise substitution of at least one byte of each of the five primary mixed words to generate, respectively, at least five primary intermediate words;
a byte mixing module configured to mix at least two bytes of each of the at least five primary intermediate words to generate, respectively, at least five secondary intermediate words;
a second word mixing module configured to mix at least two words of the at least five secondary intermediate words to generate at least five output words; and
a combining module configured to combine the at least five output words with at least five mask words selected from a second array of words to generate a key stream block for the key stream; wherein the first and second arrays are finite.

38. The apparatus of claim 37, wherein the LFSR is configured to generate the second array from the first array.

39. The apparatus of claim 37, wherein the number of input words and the number of output words are equal.

40. The apparatus of claim 37, wherein the first and second array each comprises seventeen words.

41. The apparatus of claim 37, wherein the byte substitution module is configured to perform a key-dependent Sbox substitution on the at least one byte.

42. The apparatus of claim 37, wherein the byte mixing module is configured to mix at least two bytes using a minimum distance separable matrix multiplication.

43. The apparatus of claim 37, wherein the first word mixing module is further configured to mix at least two input words based on modular arithmetic to generate the at least five primary mixed words.

44. The apparatus of claim 37, wherein second word mixing module is further configured to mix at least two words of the at least five secondary intermediate words based on modular arithmetic to generate the output words.

45. The apparatus of claim 37, wherein
each output word and mask word has two or more bytes, and
the key stream block comprises five or more words, each word having two or more bytes.

46. The method of claim 1, wherein
each output word and mask word has two or more bytes, and
the key stream block comprises five or more words, each word having two or more bytes.

47. The apparatus of claim 23, wherein
each output word and mask word has two or more bytes, and
the key stream block comprises five or more words, each word having two or more bytes.

48. The medium of claim 31, wherein
each output word and mask word has two or more bytes, and
the key stream block comprises five or more words, each word having two or more bytes.

* * * * *